June 12, 1951     R. BŘEŽEK     2,556,464
AIR INLET STRUCTURE FOR THE AERATION OF THE REAR
ENGINE COMPARTMENT IN STREAMLINED VEHICLES
Filed Feb. 27, 1948

Inventor:
Rudolf Břežek,
by Singer, Ehlert, Stern & Carlberg,
Attorneys.

Patented June 12, 1951

2,556,464

UNITED STATES PATENT OFFICE 2,556,464

AIR INLET STRUCTURE FOR THE AERATION OF THE REAR ENGINE COMPARTMENT IN STREAMLINED VEHICLES

Rudolf Březek, Prague-Smichov, Czechoslovakia, assignor to Tatra naredni podnik, Koprivnice, Czechoslovakia Application February 27, 1948, Serial No. 11,788
In Germany March 11, 1943

Section 1, Public Law 690, August 8, 1946
Patent expires March 11, 1963

2 Claims. (Cl. 180—54)

In motor vehicles with rear engine the arrangement of the aeration of the engine space is the most intricate problem to be solved, more particularly in cases of high-speed vehicles with streamlined body. In fact, the air pressure is acting upon the vehicle running almost exclusively at the vehicle front part whilst the rear part of the vehicle is surrounded by air acting thereon rather through underpressure so that it is necessary to provide various emergency means to enhance the driving in of air into the engine space. However, such emergency means present the essential drawback to interfere with the accurate aerodynamic shape of the body work thus reducing substantially its efficiency. Such emergency means are, for example, various pocket-shaped or similar projections facing the wind direction for enabling the air to penetrate inside.

According to the present invention the above mentioned drawback may be eliminated by providing the apertures wherethrough the air may penetrate inside the engine space, immediately behind the transient edge between the bottom and top portions of the vehicle body, as such edge is bringing about such an air turbulence that a pressure acting upon the vehicle body is created in these points.

Figure 1:
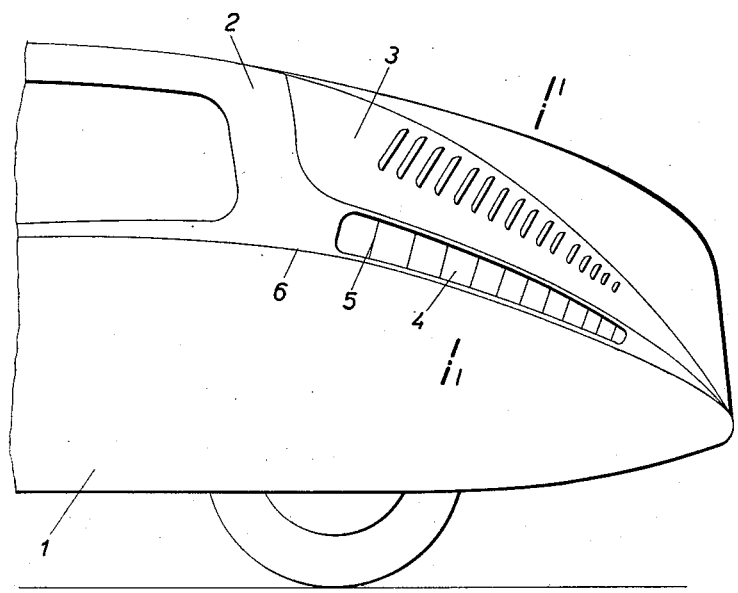

The accompanying drawing illustrates, merely by way of example, an embodiment of the object of the present invention, wherein:

Fig. 1 shows a side view and

Figure 2:
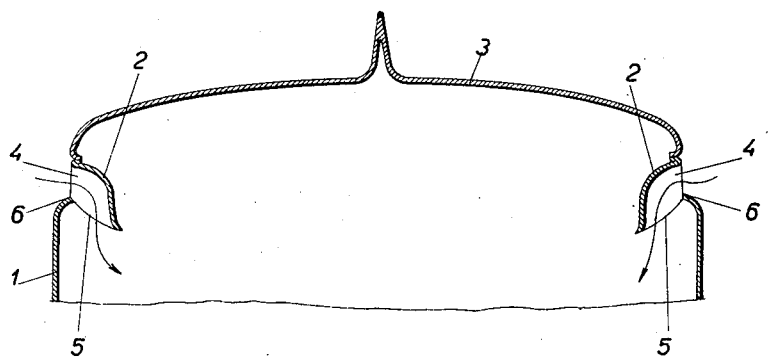

Fig. 2 a sectional view on the line I—I in Fig. 1.

Referring now to the drawing, 1 is the bottom portion of the vehicle body whereto the top portion 2 is connected which latter has a rear cutout shielded by the engine space bonnet 3. In said top portion 2 a lengthwise slot 4 is provided on both sides of the vehicle, said slot being subdivided by flat transverse walls 5 and extending close along the edge 6 separating the portions 1 and 2.

The air stream flowing over said edge 6 in rearward directions causes an air turbulence directed just inwards into said slot, the air stream gliding downwards across the walls and transverse members 5 into the engine space and thereupon flowing out in a known manner through the slots provided in the bonnet after having adequately cooled the engine. Thus a convenient air admission may be attained without the provision of projecting elements on the vehicle body, the air turbulence which otherwise prejudiciously causes an increase of the resistance to the vehicle running being caught up and rendered harmless through said slots. Moreover the arrangement of said slots contributes substantially to the pleasant appearance of the vehicle.

I claim:

1. A streamlined body for a motor vehicle having the engine arranged in the rear, comprising a lower part and an upper part, said upper part having side walls forming a continuation of the side walls of said lower part, an edge being defined where both said parts are connected with each other, and an engine cover in the rear portion of said upper part, said body having air inlet openings extending lengthwise in both sides of the rear portion of the vehicle body in the upper part thereof closely adjacent said edge and below the lower edge of said engine cover.

2. A streamlined body for a motor vehicle having the engine arranged in the rear, comprising a lower part and an upper part, said upper part having side walls forming a continuation of the side walls of said lower part, an edge being defined where both said parts are connected with each other, an engine cover in the rear portion of said upper part, said body having air inlet openings extending lengthwise in both sides of the rear portion of the vehicle body in the upper part thereof closely adjacent said edge and below the lower edge of said engine cover, and flat transverse walls in said longitudinal openings to subdivide the latter extending inwardly from the outer surface of said upper body part.

RUDOLF BŘEŽEK.

REFERENCES CITED

The following references are of record in the file of this patent:

UNITED STATES PATENTS

| Number | Name | Date |
|---|---|---|
| 2,127,409 | Klavik | Aug. 16, 1938 |
| 2,175,527 | Klavik | Oct. 10, 1939 |

FOREIGN PATENTS

| Number | Country | Date |
|---|---|---|
| 60,242 | Denmark | Oct. 12, 1942 |
| 776,021 | France | Oct. 22, 1934 |
| 874,364 | France | May 4, 1942 |